Jan. 21, 1969   G. H. GRANGAARD   3,422,549
SPELLING AND READING AID GAME
Filed June 20, 1966   Sheet 1 of 2

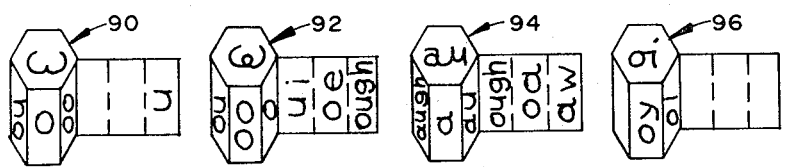
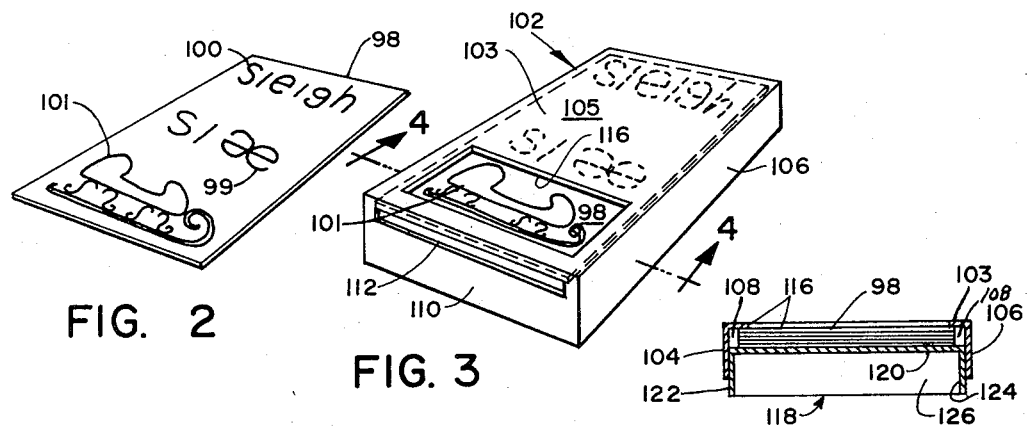
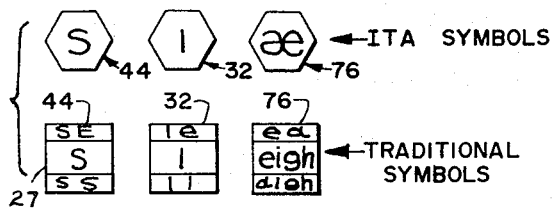
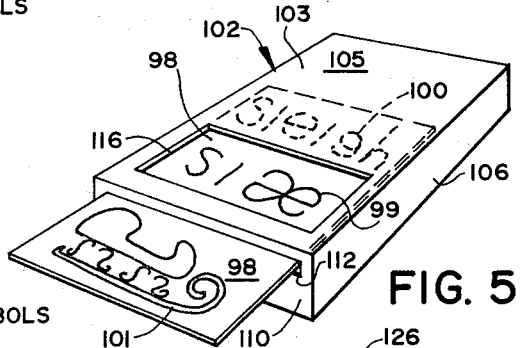
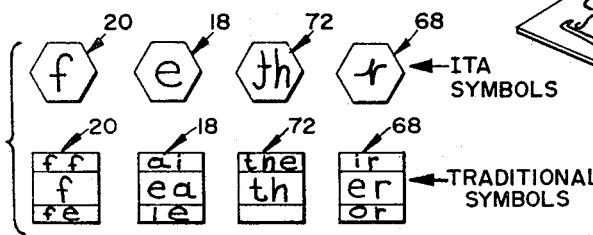
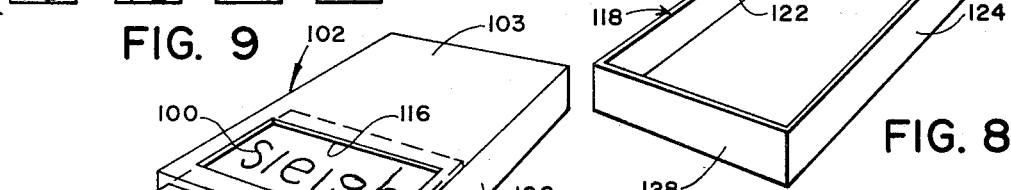

United States Patent Office 3,422,549
Patented Jan. 21, 1969

3,422,549
SPELLING AND READING AID GAME
George H. Grangaard, Winona, Minn., assignor to itaCo, Farmington, Minn., a corporation of Minnesota
Filed June 20, 1966, Ser. No. 558,886
U.S. Cl. 35—71 3 Claims
Int. Cl. A63h *33/04;* G09b *17/00*

ABSTRACT OF THE DISCLOSURE

The disclosure relates to a spelling and reading aid device including a plurality of blocks each having a plurality of sides and opposed ends. On one end of each of the blocks is a single sound symbol of a non-traditional alphabet, and one or more of the sides of the blocks has formed thereon a traditional alphabetical letter or combination of letters having the same speech sound as the symbol on the end of the member. Also included are a plurality of cards and a container for supporting the cards in stacked condition, each of the cards bearing indicia including a picture, a word including the symbols on the ends of the members identifying the picture and a word including the traditional alphabetical letter on the sides of the members identifying the picture. The container is formed with an inspection window.

The invention relates broadly to a mechanical aid for spelling and reading in the form of a game, and more particularly to a game incorporating a system used in one form with multi-side indicia-carrying members in one form of cubes or blocks together with reference cards having indicia thereon related to indicia on the blocks.

A system previously devised and incorporated here is referred to as "Initial Teaching Alphabet," briefly "ITA," which is a new reading alphabet. The "ITA" alphabet, consisting of traditional orthographic symbols and augmented Roman symbols, or any other phonemic reading alphabet, is learned first. After that alphabet is learned, there must then be a transfer to the traditional English alphabet, and it is with the subject invention that the transition is taught in a rapid and easy manner.

The ultimate in the rapid teaching and learning of the spelling of words is to learn the "ITA" alphabet or the like first and then make a transfer to the traditional alphabet. This is true for in the "ITA" alphabet there is no variance in the sound of identical letters as in the traditional alphabet where, for example, "ough" is different in sound in the word "tough" as compared with the word "through". In traditional alphabet letters various single letters or various combinations of letters can represent a single speech sound and therein lies the problem of traditional spelling and reading, whereas in "ITA" each speech sound is represented by only a single "ITA" symbol. As heretofore stated, the transfer to the traditional must be made, and such a transfer will be made easily and effectively with the present invention.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings, forming part of this application:

FIGURE 1 and 1*a* are a perspective view of the blocks used in the game with some of the sides bearing letters of the alphabet being shown as stripped from the block.

FIGURE 2 is a perspective view of a card bearing indicia illustrative of that used in the game.

FIGURE 3 is a perspective view of a card holder with the card of FIGURE 2 in a starting position therein.

FIGURE 4 is a sectional view on the line 4—4 of FIGURE 3.

FIGURE 5 is a perspective view similar to FIGURE 3 with the card therein removed to a point indicating a completed second step in the game.

FIGURE 6 is a perspective view similar to FIGURE 5 with the card therein still further removed as a completed third step in the game.

FIGURE 7 is a view of the blocks in manipulated first and second steps in the game.

FIGURE 8 is a perspective view of the bottom portion of the card holder.

FIGURE 9 is a view of the blocks in manipulated first and second steps of the game illustrating a word different from that illustrated in FIGURE 7.

Figure 1:
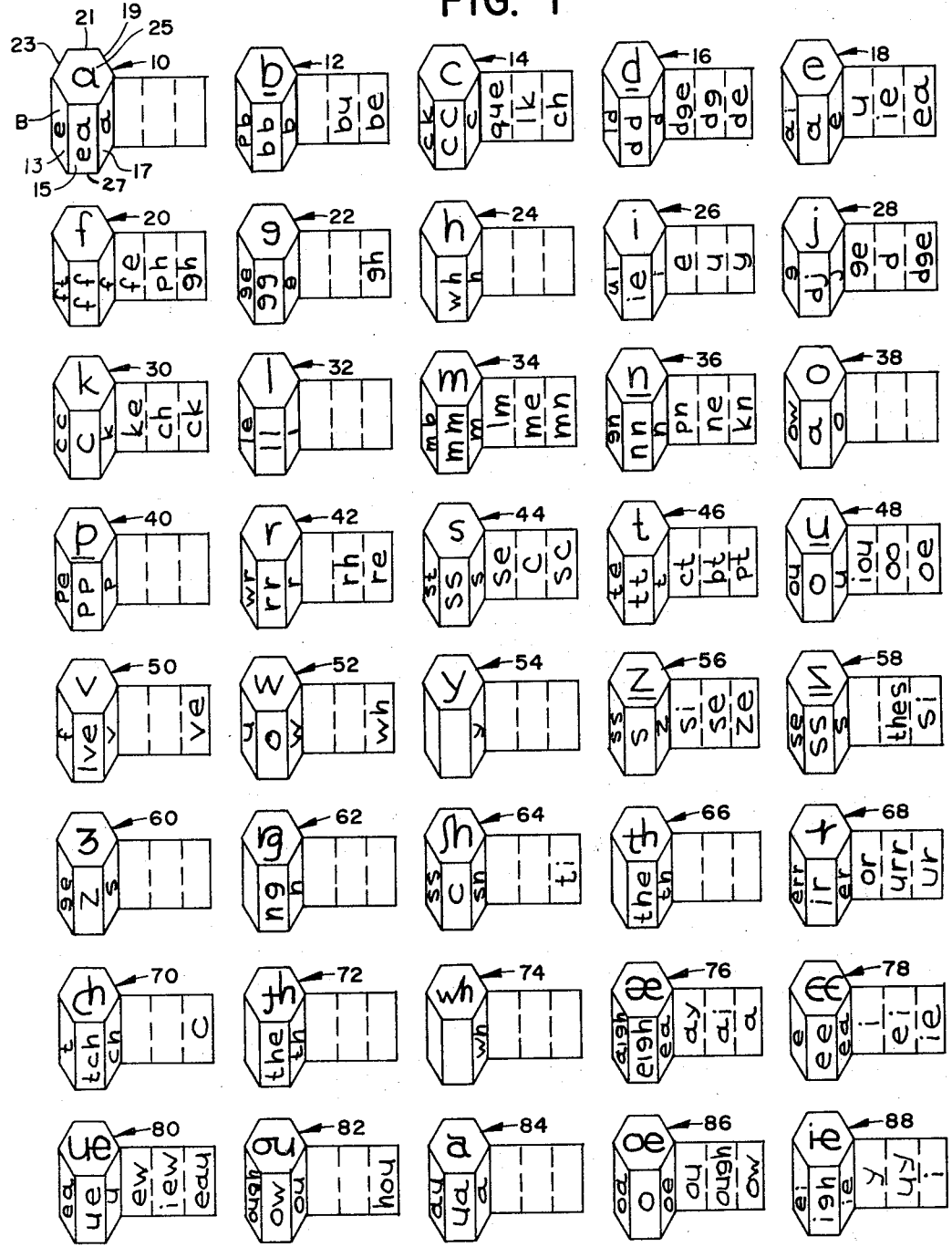

Referring to the drawings in detail, the game includes a plurality of indicia-carrying members, one form being in the form of blocks 10–96, using even numerals only to designate. The blocks are identical in form and each block is hexagonal in form with six flat sides 13, 15, 17, 19, 21 and 23, and a flat top 25 together with a flat bottom 27. The blocks need not be hexagonal but may be cubical in form, or other polyhedron formation. The top 25 of each block has formed thereon an "Initial Teaching Alphabet" (ITA) symbol or the like. As an example, there is block 12 which has formed on the upper end thereof the "ITA" symbol "*b*," and on five sides thereof are traditional alphabet letters "*pb*," "*bb*," "*b*," "*bu*" and "*be*," as seen on block 12 in FIGURE 1, which traditional letters may represent the sound written with the "ITA" symbol. The flat sides and tops allow the blocks to be positioned on a flat surface as illustrated in FIGURES 7 and 9 and to bear the various indicia.

Blocks 10–56 have the symbol formed on the top end thereof in the distinguishing color such as black, the black being the same symbol in traditional and "ITA" spelling symbols. Blocks 76–96 have the symbol on the top end thereof in a further distinguishing color such as red, the red symbol being an augmented vowel in an "ITA" symbol. Blocks 58–74 have the symbol on the top end thereof in a still further distinguishing color such as blue, the blue symbol being an augmented consonant in an "ITA" symbol. The sides of all blocks have traditional alphabet letters. Each of the symbols represents only a single speech sound. All letters or combinations thereof on the sides of the blocks represent the single sound represented by the "ITA" symbol on the end. In traditional alphabet letters various letters or various combinations of letters can represent a single speech sound and therein lies the problem of traditional spelling.

Further provided is a group of word picture cards, one of such cards shown as 98 in FIGURE 2. On the lower outer end of the card 98 is a picture or drawing of an object such as a sleigh 100 which depicts a specified word. Each card is part of a deck of cards. Substantially centrally of the card 98 is the "ITA" spelling (Slæ) as 99 for the object 100 (sleigh) depicted on the lower outer end of the card. On the upper inner end of the card 98 is the traditional spelling of the object 100, to wit, a "sleigh," as 101. Similar cards are provided with different pictures, "ITA" spelling and traditional spelling therefor.

The numeral 102 designates a box which provides a holder and support for a group of stacked cards such as 98. The holder 102 includes a top portion 103 formed with a top 105 pair of side walls 104 and 106 which converge and terminate in the upper end wall 108. The lower end wall 110 connects the lower outer ends of the side walls 104 and 106. The end wall 110 is formed with the slot 112. The top 103 is formed with the inspection opening 116 at the lower portion thereof.

The box-card holder 102 also includes the bottom portion 118 which includes the bottom 120 and the side walls 122 and 124 which converge and terminate in the upper end wall 126. At the diverging ends the walls 122 and 124 terminate in the lower end wall 128. In use the holder bottom portion 118 is inverted, and the holder top portion 103 is positioned upon the bottom portion with cards such as 98 stacked on the inverted bottom, particularly as shown in FIGURE 4.

In playing the game the word picture cards are stacked in the holder 102 with, for example, the card 98 on top as illustrated in FIGURES 3 and 4. In this condition the drawing of the sleigh 100 can be seen through the inspection opening 116. The players agree on what the drawing 100 represents. One player consults the blocks 10–96 to find the "ITA" symbol which represents the first phoneme in the word "sleigh" describing the picture. This is the sound symbol "S" found on top of block 44, see FIGURE 7. The player then consults the blocks further to find the "ITA" symbol which represents the second phoneme in the word "sleigh" describing the picture. This is the sound symbol "1" found on top of block 32, FIGURE 7. The player then consults the blocks still further to find the "ITA" symbol which represents the third phoneme in the word "sleigh" describing the picture. This is the sound symbol "æ" found on top of bloc 76, FIGURE 7. The player then has the "ITA" word for sleigh.

The player then pulls the card 98 from the holder 102 to the position of FIGURE 5 whereby the "ITA" spelling is checked as "Slæ" as seen in FIGURE 5. For the correct "ITA" spelling the player gets a point for each block used, the three blocks here giving three points. The player then proceeds to spell the word in traditional letters by manipulating of the blocks in the same relative positions by rotating the blocks on their sides using the same three blocks 44, 32 and 76 used to accomplish the "ITA" spelling as above and illustrated in FIGURE 7. The traditional spelling is checked by pulling the card 98 to the point in FIGURE 6. If the traditional spelling is correct, the player gets a point for each letter in the word as traditionally spelled. If the "ITA" spelling is not correct the player's turn stops at that point and the other player takes a turn with the next card.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A spelling and reading aid device comprising:

(a) a plurality of indicia-carrying members,
(b) each of said members having a plurality of sides and opposed ends,
(c) one end of each of said members having a single sound symbol formed thereon,
(d) one or more of said sides of said members having formed thereon a traditional alphabetical letter or combination of letters, the letter or combination of letters on each side representing a single speech sound identical in sound with the sound represented by the symbol on the end of said member whereby words may be formed from the symbols or the letters,
(e) a plurality of cards,
(f) a container for supporting said cards in stacked condition,
(g) each of said cards bearing indicia thereon including a picture, a word including the symbols on the ends of said members identifying the picture and a word including the traditional alphabetical letter on the sides of said members identifying the picture, said members manipulated to spell the word identifying the picture by using said symbols and additionally by using said traditional letters.

2. The device of claim 1 wherein,
(a) each of said cards is formed with edges converging from one end to the other, and
(b) said container having a recess formed therein with converging side walls adapted to receive and support said cards and from which said cards may be withdrawn.

3. The device of claim 2 wherein,
(a) said container is formed with an inspection opening for successively viewing said picture, said word consisting of symbols and said word consisting of traditional alphabetical letters in conjunction with the manipulation of said indicia-carrying members in using the identifying symbols and traditional alphabetical letters.

References Cited

UNITED STATES PATENTS

| 1,641,982 | 9/1927 | McDade | 35—75 |
| 2,682,118 | 6/1954 | Larsen | 35—35 |

FOREIGN PATENTS

| 622,219 | 6/1961 | Canada. |
| 1,345,112 | 10/1963 | France. |

EUGENE R. CAPOZIO, *Primary Examiner.*

H. S. SKOGQUIST, *Assistant Examiner.*

U.S. Cl. X.R.

35—73